(12) United States Patent
Kim et al.

(10) Patent No.: US 8,050,534 B2
(45) Date of Patent: Nov. 1, 2011

(54) RECORDING MEDIUM, METHOD AND APPARATUS FOR PROVIDING MANAGEMENT INFORMATION

(75) Inventors: Byungjin Kim, Kyunggi-do (KR); Kang-soo Seo, Kyunggi-do (KR); Jea-Yong Yoo, Seoul (KR); Ki Won Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 818 days.

(21) Appl. No.: 12/003,363

(22) Filed: Dec. 21, 2007

(65) Prior Publication Data

US 2008/0175561 A1    Jul. 24, 2008

Related U.S. Application Data

(63) Continuation of application No. 10/651,036, filed on Aug. 29, 2003, now Pat. No. 7,313,314, which is a continuation of application No. 10/232,706, filed on Sep. 3, 2002, now Pat. No. 6,925,247, which is a continuation of application No. 09/435,608, filed on Nov. 8, 1999, now Pat. No. 6,470,135.

(30) Foreign Application Priority Data

Nov. 8, 1998 (KR) .................................. 98-48096

(51) Int. Cl.
*H04N 9/80* (2006.01)
(52) U.S. Cl. ....................................... 386/241; 386/332
(58) Field of Classification Search ........................ None
See application file for complete search history.

(56) References Cited

U.S. PATENT DOCUMENTS

| | | | |
|---|---|---|---|
| 5,455,684 | A | 10/1995 | Fujinami et al. |
| 5,535,008 | A | 7/1996 | Yamagishi et al. |
| 5,621,840 | A | 4/1997 | Kawamura et al. |
| 5,740,307 | A | 4/1998 | Lane |
| 5,832,085 | A | 11/1998 | Inoue et al. |
| 5,859,949 | A | 1/1999 | Yanagihara et al. |
| 5,870,523 | A | 2/1999 | Kikuchi et al. |
| 5,991,502 | A | 11/1999 | Kawakami et al. |
| 6,002,834 | A | 12/1999 | Hirabayashi et al. |
| 6,016,382 | A | 1/2000 | Yamagishi et al. |
| 6,028,726 | A | 2/2000 | Yanagihara et al. |
| 6,061,382 | A | 5/2000 | Govorkov et al. |
| 6,065,050 | A | 5/2000 | DeMoney |
| 6,078,727 | A * | 6/2000 | Saeki et al. ............ 386/125 |
| 6,115,531 | A | 9/2000 | Yanagihara |
| 6,229,801 | B1 | 5/2001 | Anderson et al. |

(Continued)

FOREIGN PATENT DOCUMENTS

JP    7212768    8/1995

(Continued)

*Primary Examiner* — Huy T Nguyen
(74) *Attorney, Agent, or Firm* — Birch, Stewart, Kolasch & Birch, LLP

(57) ABSTRACT

A recording medium, method and apparatus for providing management information are provided. According to an embodiment, the method includes grouping data of a digital stream into a plurality of object units, and grouping one or more object units into an object; and creating management information for accessing the data, the management information including map information and indication information, wherein the map information includes an object unit index table associated with the object units, and wherein the indication information indicates whether the data of the digital stream are grouped into the object units on a basis of a predetermined time period or an entry point information included in the digital stream.

22 Claims, 6 Drawing Sheets

U.S. PATENT DOCUMENTS 6,282,320 B1    8/2001    Hasegawa et al.
6,466,733 B1    10/2002    Kim
6,470,135 B1    10/2002    Kim et al.
6,925,247 B2    8/2005    Kim et al.

FOREIGN PATENT DOCUMENTS

JP    8163496    6/1996
JP    9322111    12/1997
JP    10243352    9/1998

\* cited by examiner

RECORDING MEDIUM, METHOD AND APPARATUS FOR PROVIDING MANAGEMENT INFORMATION

CROSS-REFERENCE

This present application is a continuation of U.S. patent application Ser. No. 10/651,036 filed on Aug. 29, 2003 now U.S. Pat. No. 7,313,314 for which priority is claimed under 35 U.S.C. §120, which is a continuation of U.S. patent application Ser. No. 10/232,706 filed on Sep. 3, 2002 (now issued as U.S. Pat. No. 6,925,247B2 on Aug. 2, 2005) for which priority is claimed under 35 U.S.C. §120, which is a continuation of U.S. patent application Ser. No. 09/435,608 filed on Nov. 8, 1999 (now issued as U.S. Pat. No. 6,470,135 on Oct. 22, 2002) for which priority is claimed under 35 U.S.C. §120. The present application also claims priority of Patent Application No. 98-48096 filed in Republic of Korea on Nov. 8, 1998 under 35 U.S.C. §119. The entire contents of each of these applications are herein fully incorporated by reference.

BACKGROUND OF THE INVENTION

1. Field of the Invention

The present invention relates to a method and apparatus for recording received digital data streams on a recording medium and creating and recording management information pertaining to the recorded digital data streams on the recording medium.

2. Description of the Related Art

In conventional analog television broadcast systems, video signals are transmitted over the air or through cables after being AM or FM modulated. With the recent advance of digital technologies such as digital image compression or digital modulation/demodulation, standardization for digital television broadcast is in rapid progress. Based upon the Moving Picture Experts Group (MPEG) format, satellite and cable broadcast industry also moves towards digital broadcast.

Digital broadcast offers several advantages that its analog counterpart cannot provide. For example, digital broadcast is capable of providing services with far more improved video/audio quality, transmitting several different programs within a fixed bandwidth, and offering enhanced compatibility with digital communication media or digital storage media.

In digital broadcast, a plurality of programs encoded based upon the MPEG format are multiplexed into a transport stream which is then transmitted. The transmitted transport stream is received by a set top box at the receiver and demultiplexed into a plurality of programs. If a program is chosen from the demultiplexed programs, the chosen program is decoded by a decoder in the set top box and original audio and video signals are retrieved. The retrieved audio and video signals can be presented by an A/V output apparatus such as a TV.

It is also possible to record the received digital broadcast signals on a storage medium instead of directly outputting the received broadcast signals to A/V output devices. The stored digital broadcast signals can be edited and retrieved afterwards. For example, a digital data stream received by a set top box can be stored in a streamer such as a digital video disk (DVD) recording apparatus after being transmitted through communication interfaces like an IEEE-1394 serial bus. Later, the stored digital data stream can be edited and transmitted back to the set top box so that the stored original digital audio and video data can be presented.

For the above-mentioned systems, it is necessary to develop a method for recording a received digital data stream on a recording medium by partitioning the received data stream into minimum presentation units, each minimum presentation unit being a data decoding unit. Unless the recorded data stream maps to random-accessible minimum presentation units, the initial reproduction of the recorded stream after search operations may be imperfect.

SUMMARY OF THE INVENTION

Accordingly, it is an object of the present invention to provide a recording medium, method and apparatus for providing management information pertaining to recorded digital data streams, and to provide a method and apparatus for recording and/or reproducing data to and/or from a recording medium.

According to an embodiment, the present invention provides a method of providing management information, comprising: grouping data of a digital stream into a plurality of object units, and grouping one or more object units into an object; and creating management information for accessing the data, the management information including map information and indication information, wherein the map information includes an object unit index table associated with the object units, and wherein the indication information indicates whether the data of the digital stream are grouped into the object units on a basis of a predetermined time period or an entry point information included in the digital stream.

According to an embodiment, the present invention provides a recording medium providing management information for data of a digital stream, the data of the digital stream grouped into a plurality of object units, the recording medium comprising: at least one object including one or more of the object units, each of the object units having grouped data, and management information for accessing the data of the digital stream, the management information including map information and indication information, wherein the map information includes an object unit index table associated with the object units, and wherein the indication information indicates whether the data of the digital stream are grouped into the object units on a basis of a predetermined time period or an entry point information included in the digital stream.

According to an embodiment, the present invention provides an apparatus for providing management information, comprising: a formatter configured to group data of a digital stream into a plurality of object units, and to group one or more object units into an object and a controller configured to create management information for accessing the data of the digital stream, the management information including map information and indication information, wherein the map information includes an object unit index table associated with the object units, and wherein the indication information indicates whether the data of the digital stream are grouped into the object units on a basis of a predetermined time period or an entry point information included in the digital stream.

According to an embodiment, the present invention provides an apparatus for reproducing data, comprising: a reproducing unit; and a controller configured to control the reproducing unit to reproduce data of a digital stream from a recording medium using management information, wherein the data of the digital stream are grouped into a plurality of object units, one or more object units grouped into an object, wherein the management information includes map information and indication information, wherein the map information includes an object unit index table associated with the object units, and wherein the indication information indicates whether the data of the digital stream are grouped into the object units on a basis of a predetermined time period or an entry point information included in the digital stream.

According to an embodiment, the present invention provides a method of providing management information, comprising: grouping data of a digital stream into a plurality of object units on a basis of a predetermined time period, and grouping one or more object units into an object; and creating management information for accessing the data, wherein the management information includes an object unit index table associated with the object units, and the object unit index table includes object unit information associated with the object units, and wherein the management information includes indication information that indicates if the data of the digital stream are grouped into the object units based on the predetermined time period.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENTS

In order that the invention may be fully understood, preferred embodiments thereof will now be described with reference to the accompanying drawings.

Figure 1:
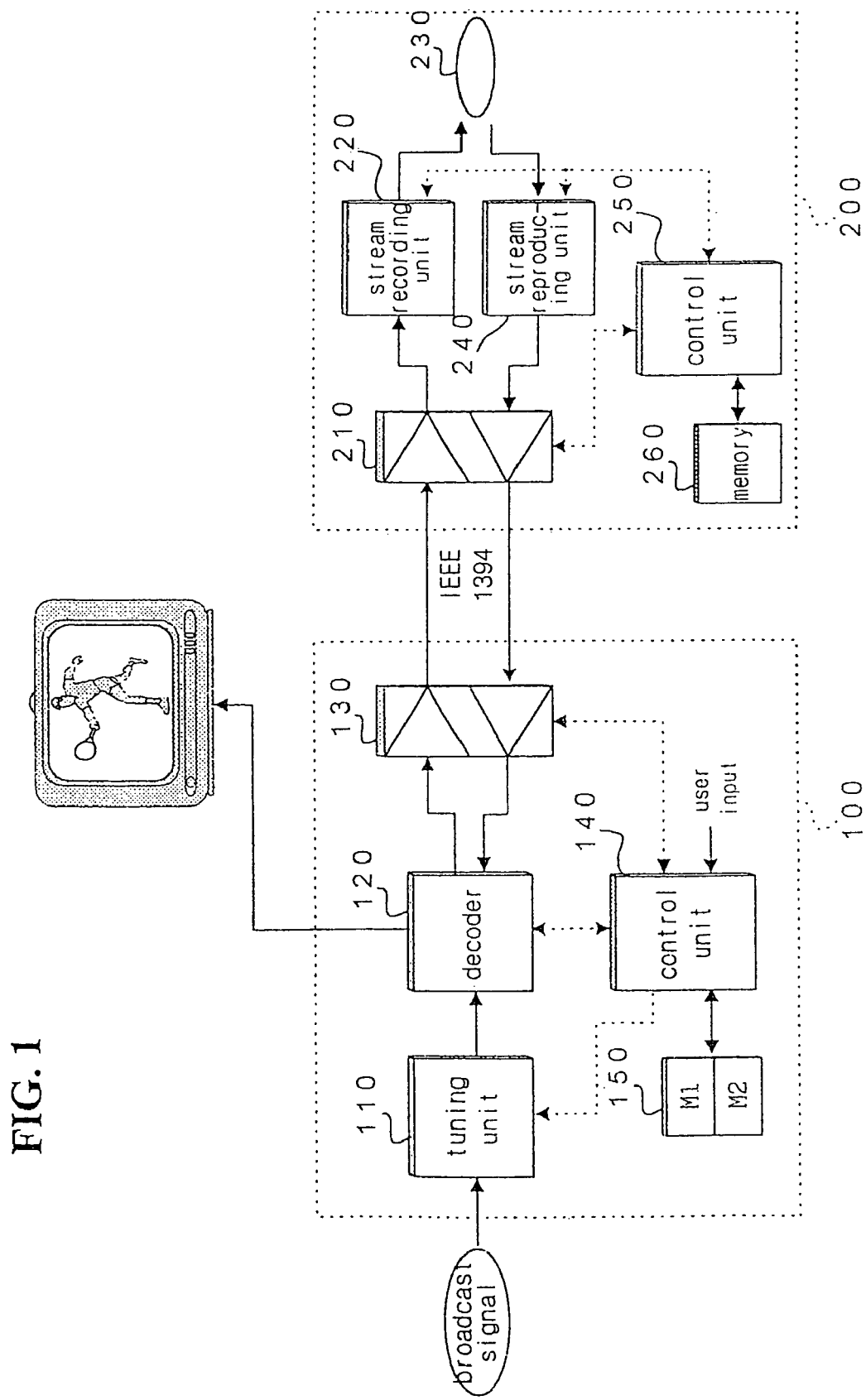
FIG. 1 is a block diagram of an apparatus in which the present invention may be advantageously practiced.

FIG. 1 depicts a block diagram of an apparatus in which the present invention may be practiced according to an embodiment of the invention. The apparatus includes a set top box 100, a communication interface (e.g., IEEE-1394), and a streamer 200, all operatively coupled and configured.

The set top box 100 receives transport streams encoded by system encoders and transmitted by a plurality of broadcast stations and demultiplexes the received transport streams. After a system decoder 120 decodes the transport stream of a program tuned by a tuning unit 110, a control unit 140 outputs the decoded transport stream to an A/V output device such as a TV set for presentation.

The set top box 100 may transmit a program chosen by a user to the streamer 200 through an interface such as the IEEE-1394 interface so that the transmitted program is recorded on a recording medium 230 such as a digital video disk by the streamer 200.

In addition, as requested by a user, the set top box 100 may receive a program retrieved from the recording medium 230 by the streamer 200 through the IEEE-1394 communication interface so that the received program can be presented on a TV set after being decoded by the decoder 120.

Figure 2:
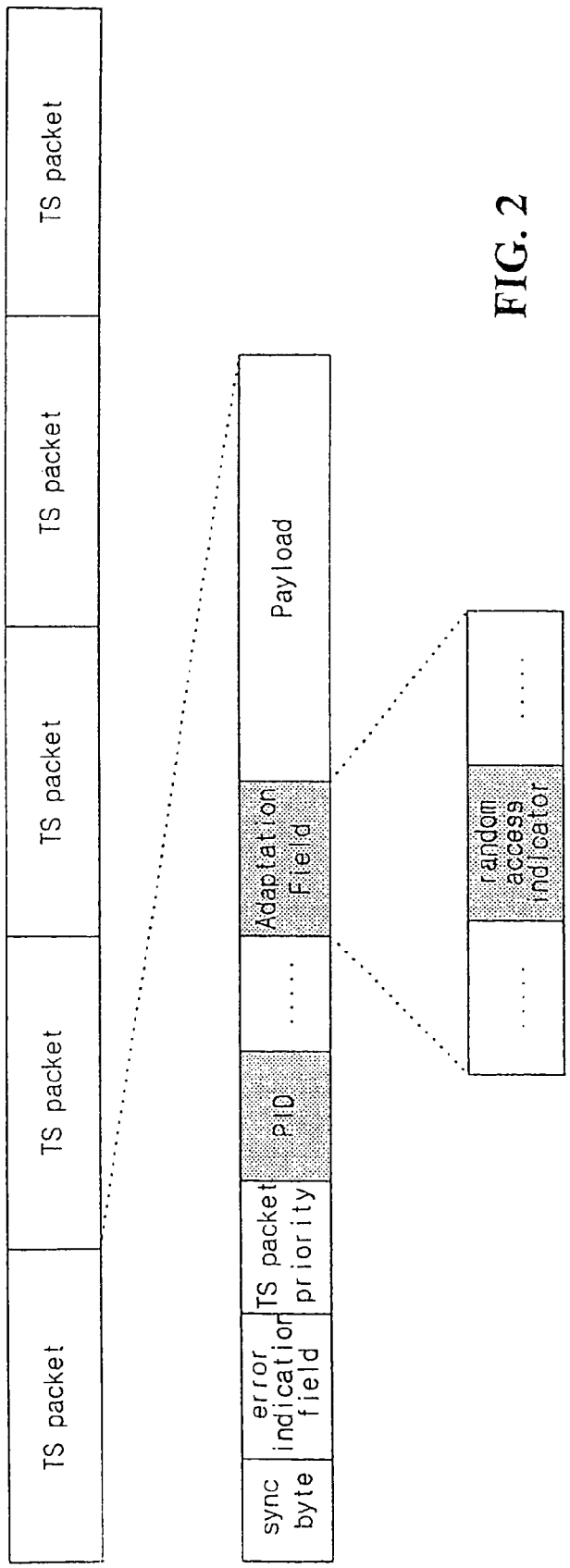
FIG. 2 is a pictorial representation showing the syntax of a digital data stream.

A transport stream packet of a program stream, as shown in, e.g., FIG. 2, includes a packet header and a payload, the packet header containing fields of a 8-bit sync byte, an error indication field indicative of a possible error of the packet, a PID showing attributes of the data contained in the payload, and an adaptation field. The adaptation field contains various information on the properties of the data stream, such as a random access indicator indicating the start of a video sequence header which is a random access entry point.

Figure 3:
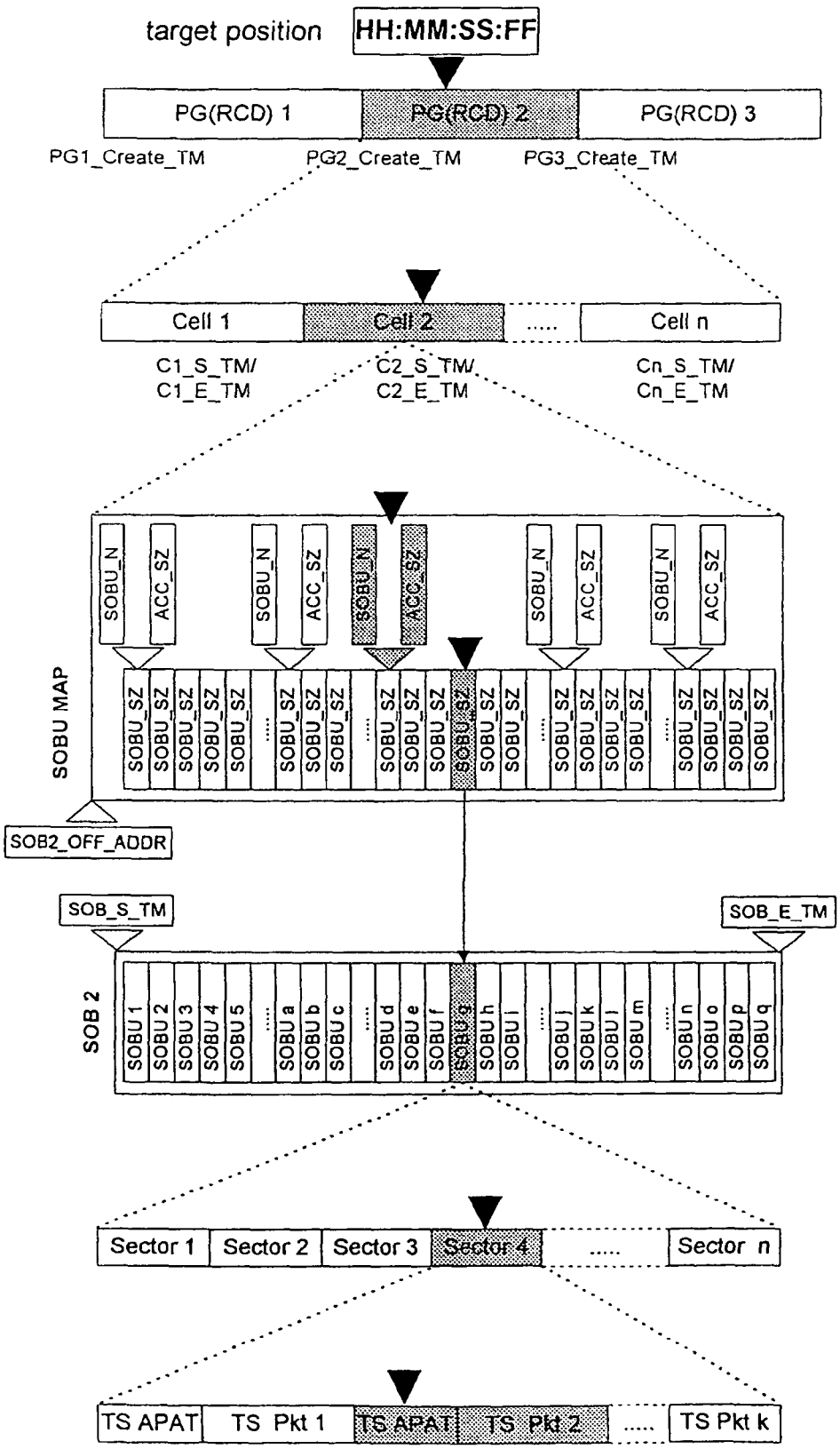
FIG. 3 is a pictorial representation showing an example of the syntax of the recorded data and the management information pertaining to the recorded data created by an embodiment of the present invention.

The method for recording digital data streams in accordance with an embodiment of the present invention will now be described with reference to FIGS. 1 and 3.

If a user's request for recording an incoming data stream tuned by the tuning unit 110 has been received, the control unit 140 of the set top box 100 informs a control unit 250 of the streamer 200 that a recording mode is set and begins to transfer the received digital stream to the streamer 200 through the interface such as the IEEE-1394 interface. The control unit 250 of the streamer 200 controls a stream recording unit 220 to record the received data stream on the recording medium 230. The transport stream packets (TS Pkt 1~TS Pkt k) constituting the data stream are recorded on the recording medium 230 along with respective transport stream packet arrival times (TS APATs), wherein the transport stream packets with packet arrival times are organized in sectors on the recording medium 230.

Concurrently, the control unit 250 of the streamer 200 detects the random access indicator contained in a transport stream packet header. If a random access indicator is detected, previously received transport stream packets and the transport stream packet having the random access indicator are grouped into a stream object unit (SOBU). Likewise, transport stream packets received after the transport stream packet having the random access indicator and a transport stream packet having the next random access indicator are grouped into another stream object unit (SOBU). In this manner, the received data stream is recorded on the recording medium as a series of stream object units (SOBU 1~SOBU q) as shown in FIG. 3. A stream object unit presentation time (SOBU_TM) and a stream object unit size (SOBU_SZ) are created for each stream object unit (SOBU) and recorded as management information pertaining to the associated stream object unit, where the stream object unit size (SOBU_SZ) is expressed in terms of the number of sectors in which the associated stream object unit (SOBU) is recorded. As shown in FIG. 3, the specific location of a desired SOBU (e.g., SOBU g) can be identified using the stream object unit size (SOBU_SZ), such that the SOBU_SZ can be considered location information.

If a predetermined number, for example 20, of stream object units (SOBUs) are created by repeating the grouping task, the control unit 250 creates and records a stream object unit index number (SOBU_N), an accumulated presentation time (ACC_TM), and an accumulated size (ACC_SZ) for the 20 stream object units. The accumulated presentation time (ACC_TM) and accumulated size (ACC_SZ) for each of 20 stream object units are the presentation time and size accumulated from the start position (SOB2_OFF_ADDR) of the stream object (SOB2) containing the associated stream object units to each of 20 stream object units, respectively. In this aspect, ACC_SZ can be considered location information.

After the recording mode ends, the control unit 250 of the streamer 200 groups the created stream object units (SOBUs) into a stream object (SOB) and groups the recorded accumulated sizes (ACC_SZs) and stream object unit sizes (SOBU_SZs) into a map. The map is stored in the management information area of a memory 260 as stream object information (SOBI).

Subsequently, the control unit 250 of the streamer 200 creates a presentation sequence information (Cell) concerning the map and stores the cell as the presentation sequence information corresponding to the created record (RCD) or program (PG) in the management information area of the memory 260.

The method for a time search operation by a user will now be explained by assuming that digital data streams are recorded on the recording medium by the aforementioned method.

If a user enters a search time (HH:MM:SS:FF) in order to search for a specific position on the recording medium 230, the control unit 250 of the streamer 200 looks for a record (RCD) or program (PG) corresponding to the user's search time (HH:MM:SS:FF) with reference to the creation times (PG1_Create_TM, PG2_Create_TM, PG3_Create_TM) of records (RCD1~RCD3) or programs (PG1~PG3). Suppose the detected program is PG2 shown in FIG. 3. Then, the control unit 250 looks for a Cell (Cell 2 shown in FIG. 3) corresponding to the user's search time (HH:MM:SS:FF) with reference to the presentation start time (C1_S_TM, C2_S_TM, . . . , Cn_S_TM) and presentation end time (C1_E_TM, C2_E_TM, . . . , Cn_E_TM) of each Cell contained in the detected program PG2.

Referring to the stream object information (SOBI) of the stream object SOB2 associated with the detected presentation sequence information Cell 2, the control unit 250 detects a target accumulated entry (ACC Entry, the entry shaded in FIG. 3) containing the accumulated presentation time (ACC_TM) which is closest to the difference between the user's search time (HH:MM:SS:FF) and the stream object start time (SOB_S_TM). Lastly, the control unit 250 detects a stream object unit (SOBU) corresponding to the stream object unit presentation time (SOBU_TM) of the stream object unit containing the user's search time (HH:MM:SS:FF) by accumulating stream object unit presentation times (SOBU_TMs) from the stream object unit pointed to by the detected accumulated entry (ACC Entry). The target stream object unit (SOBU) can be located by adding the accumulated size (ACC_SZ) of the target accumulated entry (ACC Entry) to the sum of stream object sizes (SOBU_SZs) calculated from the stream object unit pointed to by the target accumulated entry (ACC Entry).

The control unit 250 controls a stream reproducing unit 240 to reproduce transport stream packets from the first sector (Sector 1) in which the detected target stream object unit (SOBUg shown in FIG. 3) is recorded and transmit the reproduced transport stream packets to the set top box 100 through the IEEE-1394 interface. The decoding operation, therefore, is performed from the transport stream packet having a random access indicator, which means video data is reproduced from the Intra-picture and audio data is reproduced from the first bye of a frame.

Figure 4A:
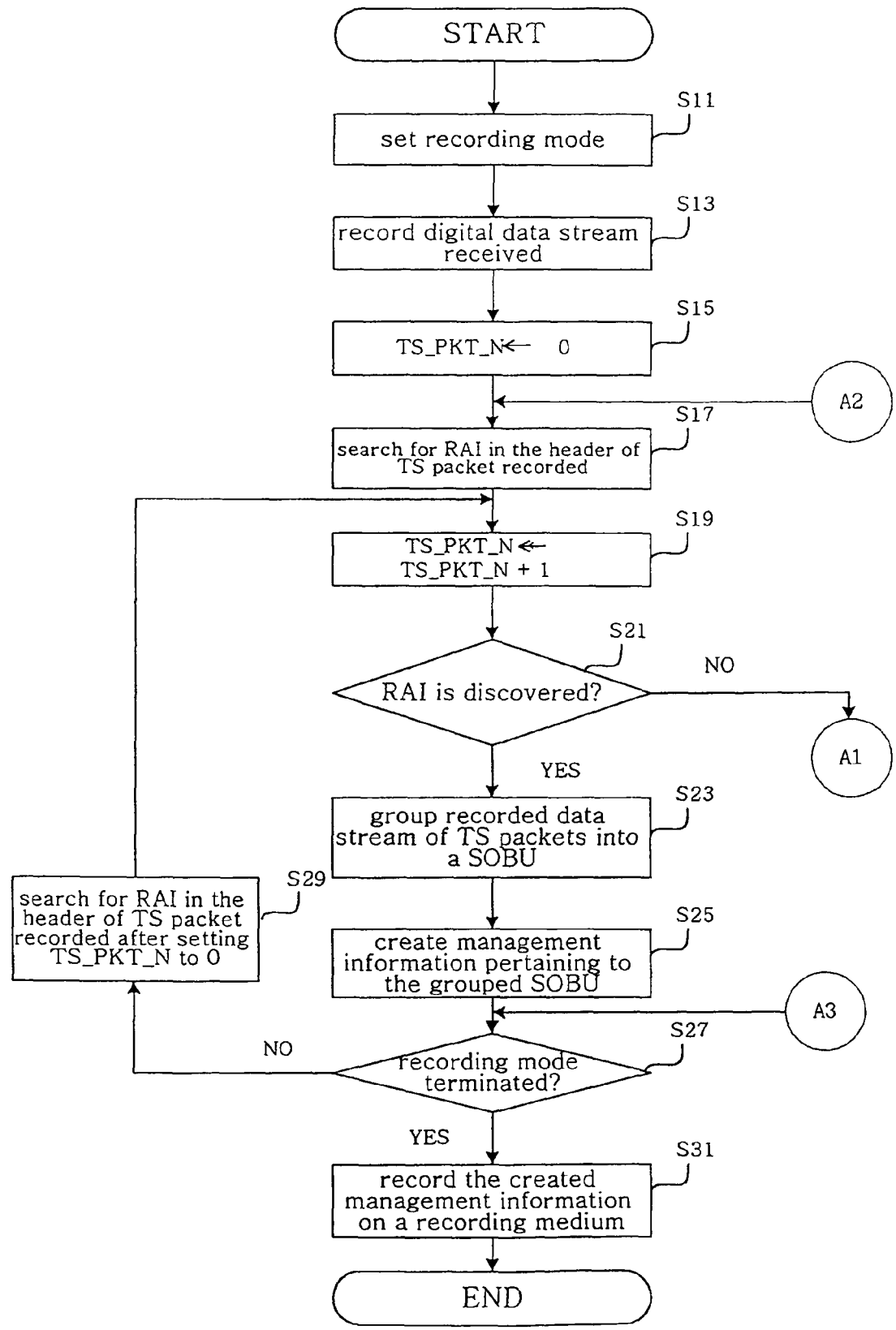
FIGS. 4A and 4B are flow diagrams of a method for recording digital data streams according to an embodiment of the present invention.
Figure 4B:
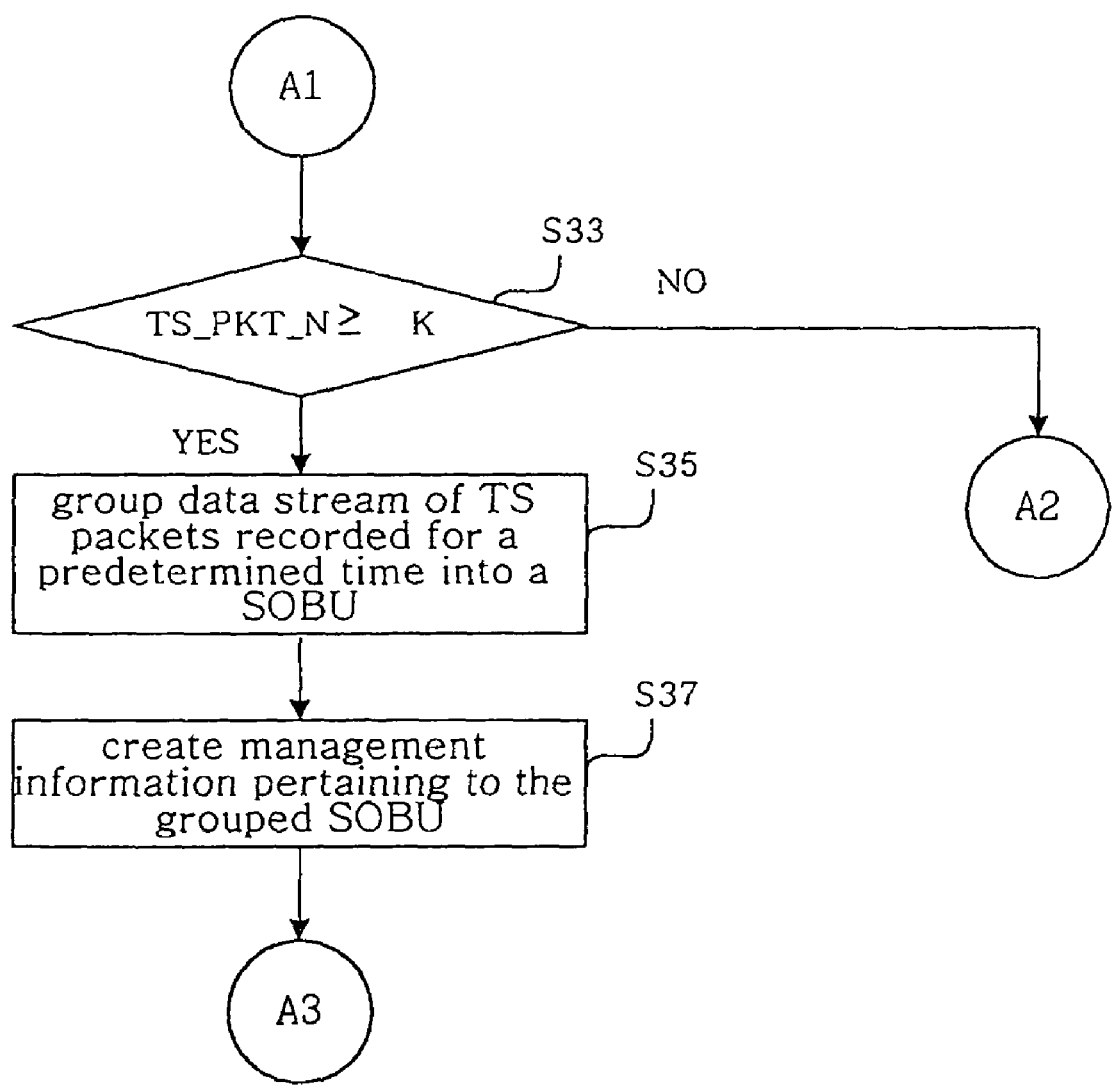

The method for recording digital data streams in accordance with an embodiment of the present invention will be described with reference to the flow diagrams shown in FIGS. 4A and 4B.

If a user's request for recording an incoming data stream tuned by the tuning unit 110 has been received, the control unit 140 of the set top box 100 informs the control unit 250 of the streamer 200 that a recording mode is set and begins to transfer the received digital stream to the streamer 200 through the IEEE-1394 interface (S11).

The control unit 250 of the streamer 200 controls the stream recording unit 220 to record the data stream received through the IEEE-1394 interface on the recording medium 230 (S13). The transport stream packets (TS Pkt 1~TS Pkt k) constituting the data stream are recorded on the recording medium 230 along with respective transport stream packet arrival times (TS APATs), wherein the transport stream packets with packet arrival times are organized in sectors on the recording medium 230.

Subsequently, the control unit 250 resets an internal register for storing the number of transport stream packets (TS_Pkt_N) to zero (S15) and searches for a random access indicator (RAI) in the header of the first transport stream packet of the input data stream (S17). And the control unit 250 increments the internal register value indicative of the number of transport stream packets (TS_Pkt_N) by 1 (S19) and checks if a random access indicator has been discovered in step S17 (S21).

In the instance where the existence of a random access indicator is confirmed in step S21, the transport stream packets received up to the transport stream packet having the random access indicator are grouped into a stream object unit (SOBU) as discussed above (S23). Likewise, transport stream packets received after the transport stream packet having the random access indicator and the transport stream packet having the next random access indicator are grouped into another stream object unit (SOBU).

If a stream object unit is created, the control unit 250 creates a stream object unit presentation time (SOBU_TM) and a stream object unit size (SOBU_SZ) for the stream object unit (SOBU) and stores such map information in the management information area of the memory 260 as management information regarding the stream object unit (SOBU).

The control unit 250 checks whether a request for terminating the recording mode has been received (S27) during the recording mode. If it is not received, the control unit 250 continues to search for a random access indicator in the input data stream and initializes the number of transport stream packets (TS_Pkt_N) (S29). And the flow returns to step S19.

If the terminating command is received, the control unit 250 reads the management information stored in the management information area of the memory 260 and records the management information in the management information area of the recording medium 230 before terminating the recording mode (S31).

After the recording mode ends, the control unit 250 of the streamer 200 groups the created stream object units (SOBUs) into a stream object (SOB), and groups the recorded accumulated sizes (ACC SZs), which have been generated during the recording mode as in the aforementioned embodiment, and stream object unit sizes (SOBU SZs) into a map. The map is stored in the management information area of the memory 260 as stream object information (SOBI). In addition, the control unit 250 also creates presentation sequence information for the grouped stream object and records it as cell information for the stream object.

Additionally, the control unit 250 sets the value of a stream object unit grouping type indication flag contained in the stream object information (SOBI) to 1 for indicating that stream object units constituting the stream object are created based upon the random access indicator.

The value of the stream object unit grouping type indication flag implies that the stream object unit (SOBU) is created so that it is randomly accessible and thus the stream object unit (SOBU) is the basic group for a trick-play which means data-discrete reproduction. This fact also means that the stream object unit (SOBU) contains a random access entry point.

Stream object units can be created in many different ways. For example, it is possible to generate stream object units of a predetermined size without regard to the random access indicator. If a random access indicator is detected from a stream object unit, a flag indicative of the fact can be set to 1 for the stream object unit (SOBU) and recorded on the recording medium.

To be more specific, an n-bit data is created for a stream object including n stream object units (SOBU1~SOBUn) and each bit of the data is associated with each stream object unit. Then, it can be examined whether a stream object unit (SOBU) has a random access indicator by simply checking the associated bit value.

In the meantime, if it is verified that a random access indicator is not discovered in step S21, the control unit 250 checks if the number of transport stream packets (TS_PKT_N) stored in the internal register is greater than a predetermined value K (S33). If not, the flow returns to step S17 and continues the aforementioned procedure.

The value K is determined in consideration of the minimum transfer rate of a data stream. For example, suppose that the desirable minimum time length of a stream object unit (SOBU) is 0.5 s (seconds) and the minimum transfer rate of an input data stream is 3 Mbps. In this case, the size of data received for 0.5 s exceeds 1875000 bytes and more than 997 transport stream packets are received for 0.5 s with each transport stream packet having 188 bytes. Considering the number of transport stream packets received for 0.5 s, it is desirable to set the value K greater than 997. It is because at least one packet among 997 transport stream packets should have a random access indicator if the data stream is supposed to contain random access indicators.

If the number of transport stream packets (TS_PKT_N) stored in the internal register is greater than the predetermined value K in step S33, the control unit 250 decides that random access indicators were not inserted into the data stream when the data stream was transmitted by the associated broadcast station. The flow continues to step S35.

With reference to time information contained in the transport stream packets, the control unit 250 records the received transport stream packets by grouping them into stream object units, with each stream object unit (SOBU) having a fixed time length, for example, 0.5 s (S35). Also, the control unit 250 creates a stream object unit size (SOBU_SZ) and a stream object unit presentation time (SOBU_TM) for each stream object unit (SOBU) and records the created information as management information for the associated stream object unit (SOBU) (S37). The stream object unit size (SOBU_SZ) of a stream object unit (SOBU) is expressed in terms of the number of sectors containing the stream object unit. If 20 stream object units (SOBUs) are created after 10 s elapses, the control unit 250 creates and records a stream object unit index number (SOBU_N), an accumulated presentation time (ACC_TM), and an accumulated size (ACC_SZ) for each stream object unit (SOBU). The accumulated presentation time (ACC_TM) and accumulated size (ACC_SZ) of a stream object unit are the presentation time and size accumulated from the start position (SOB2_OFF_ADDR) of the stream object (SOB2) containing the stream object unit to the stream object unit, respectively.

After the recording mode ends, the control unit 250 groups the created stream object units (SOBUs) into a stream object (SOB) and groups the recorded accumulated sizes (ACC_SZs) and stream object unit sizes (SOBU_SZs) into a map. The map is stored in the management information area of the memory 260 as stream object information (SOBI).

At this time, the control unit 250 sets the stream object unit grouping type indication flag contained in the stream object information (SOBI) to zero to inform that stream object units (SOBUs) constituting the stream object (SOB) have not been generated based upon random access indicators but generated based upon time.

Subsequently, the control unit 250 of the streamer 200 creates a presentation sequence information (Cell) concerning the map and stores it in the management information area of the memory 260 as the presentation sequence information corresponding to the record (RCD) or program (PG) which has been created by a single recording operation.

The control unit 250 checks whether a request for terminating the recording mode has been received (S39). If so, the flow branches to step S31 wherein the management information (e.g., structure shown in FIG. 3 and discussed above) stored in the management information area of the memory 260 is recorded in the management information area of the recording medium 230 and the recording mode terminates. If not, the flow returns to step S35 to the aforementioned recording procedure.

Figure 5:
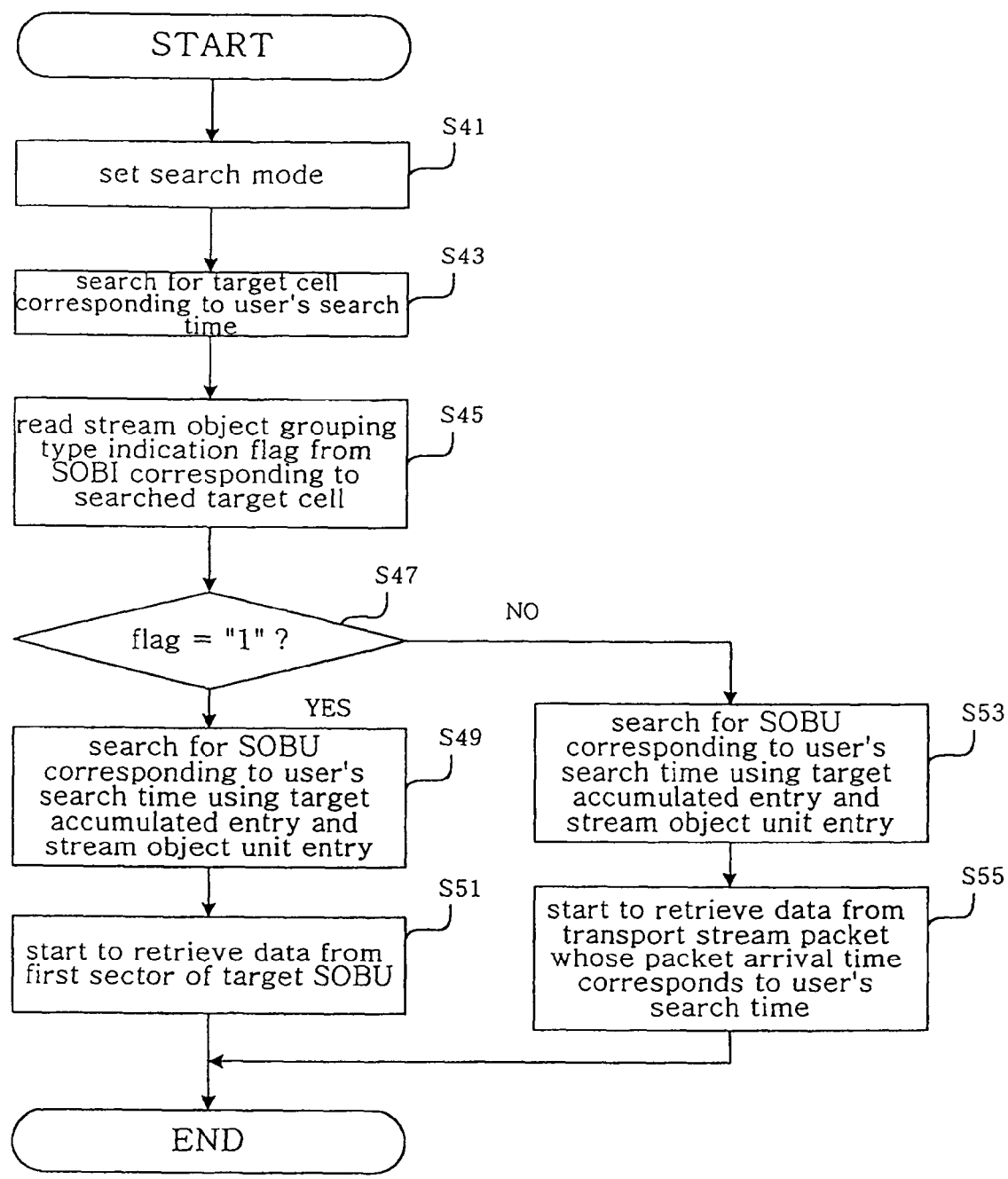
FIG. 5 is a flow diagram of the method for searching a digital data stream recorded by an embodiment of the present invention.

If a user sets a time search mode in order to search for specific data recorded on the recording medium by the above-mentioned method described with reference to FIGS. 4A and 4B, the search operation begins. A detailed explanation about the search operation will be given below with reference to FIGS. 3 and 5 according to an embodiment of the present invention.

If a user enters a search time (HH:MM:SS:FF) in order to search for a specific position on the recording medium 230 (S41), the control unit 250 of the streamer 200 looks for a record (RCD) or program (PG) corresponding to the user's search time (HH:MM:SS:FF) with reference to the creation times (PG1_Create_TM, PG2_Create_TM, PG3_Create_TM) of records (RCD1~RCD3) or programs (PG1~PG3). Suppose the detected program is PG2 shown in FIG. 3. Then, the control unit 250 looks for a Cell (Cell 2 shown in FIG. 3) corresponding to the user's search time (HH:MM:SS:FF) with reference to the presentation start time (C1_S_TM, C2_S_TM, Cn_S_TM) and presentation end time (C1_E_TM, C2_E_TM, . . . , Cn_E_TM) of each Cell contained in the detected program PG2 (S43).

Next, the control unit 250 reads stream object unit grouping type indication flag from the stream object information (SOBI) of the stream object SOB 2 corresponding to the detected Cell 2 (S45) and checks if the flag is 1 (S47). The flag value "1" indicates that stream object units constituting the stream object SOB 2 have been created based on random access indicators (S47).

If it is confirmed in step S47 that the flag is 1, the control unit 250 searches for a stream object unit (SOBUg in FIG. 3) corresponding to the user's search time as explained with reference to FIG. 3 (S49) and controls the stream reproducing unit 240 so that reproduction of recorded data begins from the packets located in the first sector (Sector 1) containing the stream object unit SOBUg and the retrieved data can be transferred to the set top box 100 through the interface such as the IEEE-1394 interface 210 (S51).

If it is confirmed in step S47 that the flag is not 1, the control unit 250 detects a target accumulated entry (ACC Entry, the entry shaded in FIG. 3) containing the accumulated presentation time (ACC_TM) which is closest to the difference between the user's search time (HH:MM:SS:FF) and the stream object start time (SOB_S_TM) with reference to the stream object information (SOBI) of the stream object SOB2 associated with the detected presentation sequence information Cell 2. Lastly, the control unit 250 detects a stream object unit (SOBU) corresponding to the stream object unit presentation time (SOBU_TM) of the stream object unit containing the user's search time (HH:MM:SS:FF) by accumulating stream object unit presentation times (SOBU_TMs) from the stream object unit pointed to by the detected accumulated entry (ACC Entry). The target stream object unit (SOBU) can be located by adding the accumulated size (ACC_SZ) of the target accumulated entry (ACC Entry) to the sum of stream object sizes (SOBU_SZs) calculated from the stream object unit pointed to by the target accumulated entry (ACC Entry) (S53).

As a next step, the control unit 250 detects the transport stream packet arrival time (TS APAT) of each transport stream packet from the first Sector 1 containing the detected stream object unit SOBUg and compares the packet arrival time with the user's search time (HH:MM:SS:FF). The control unit 250 starts to retrieve recorded data from the transport stream packet whose packet arrival time is after the user's search time and controls the stream reproducing unit 240 so that the retrieved data can be transferred to the set top box 100 through the IEEE-1394 interface 210 (S55).

The invention may be embodied in other specific forms. For example, the invention is not only applicable to the apparatus shown in FIG. 1 but applicable to any system including a subsystem functioning as a set top box, another subsystem functioning as streamer, and a communication interface between the two systems.

In the previous embodiments, the random access indicators contained in the received data stream were detected by the control unit of the streamer. It is also possible, however, for the control unit of the set top box to detect the random access indicators and transmit the detected random access indicators to the streamer through the IEEE-1394 interface. In this case, the control unit of the set top box detects random access indication information for each transport stream packet and adds a flag indicative of the existence of the random access indication information during time stamping of the associated transport stream packet. The control unit of the streamer checks the flag and determines the method for creating stream object units depending on the flag value.

According to the present invention, random access information contained in a received digital data stream is detected and stream object units are created based upon the detected random access information, which enables reproduction of recorded data to start from the transport stream packet having the random access information and prevents imperfect data reproduction after track seek or time seek operations.

Also, the received digital data stream is recorded on a recording medium by partitioning the received data stream into random-accessible minimum presentation units or presentation units of a fixed time length depending upon the existence of random access indication information, thereby not limiting the usage of the apparatus.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of recording, by a recording device, a data structure for managing a reproduction of a data stream, comprising;
    grouping, by the recording device, data of the digital stream into a plurality of object units based on an entry point information included in the digital stream; and
    creating, by the recording device, presentation sequence information identifying a start time and an end time for a presentation unit, and management information for accessing the data, the management information including map information and type indication information,
    wherein the map information includes an object unit index associated with the plurality of object units, and
    wherein the type indication information indicates whether the data of the digital stream are grouped into the plurality of object units based on the entry point information included in the digital stream.

2. The method of claim 1, wherein, when the type indication information further indicates whether the data are grouped into the plurality of object units based on a predetermined arrival period, the management information includes a time length of each object unit.

3. The method of claim 2, wherein the time length is fixed.

4. The method of claim 1, wherein the plurality of object units has uniform time lengths.

5. The method of claim 1, wherein one or more of the plurality object units is grouped into an object.

6. A non-transitory recording medium having a data structure for managing reproduction of data of a digital stream by an apparatus, the recording medium comprising:
    an object including a plurality of object units, each of the plurality of object units having the data grouped by the apparatus based on whether or not entry point information is included in the digital stream, and
    management information for accessing and managing the reproduction of the data of the digital stream by the apparatus, the management information including presentation sequence information identifying a start time and an end time for a presentation unit, map information and type indication information,
    wherein the map information includes an object unit index associated with the plurality of object units and location information associated with the plurality of object units, and
    wherein the type indication information indicates whether the data of the digital stream are grouped into the plurality of object units based on whether or not the entry point information is included in the digital stream.

7. The non-transitory recording medium of claim 6, wherein, when the type indication information further indicates whether the data of the digital stream are grouped into the plurality of object units based on a predetermined arrival period, the location information identifies a size of the grouped plurality of object units.

8. The non-transitory recording medium of claim 7, wherein the predetermined time period is fixed.

9. The non-transitory recording medium of claim 6, wherein the plurality of object units has uniform time lengths.

10. An apparatus for recording a data structure for managing a reproduction of data of a digital stream, comprising:

a formatter configured to group the data of the digital stream into a plurality of object units based on an entry point information included in the digital stream; and a controller configured to create presentation sequence information identifying a start time and an end time for a presentation unit, and management information for accessing the data of the digital stream, the management information including map information and type indication information, wherein the map information includes an object unit index associated with the plurality of object units, and wherein the type indication information indicates whether the data of the digital stream are grouped into the plurality of object units based on the entry point information included in the digital stream.

11. The apparatus of claim 10, wherein, when the type indication information further indicates whether the data are grouped into the plurality of object units based on a predetermined arrival period, the management information includes a time length of each object unit.

12. The apparatus of claim 11, wherein the time length is fixed.

13. The apparatus of claim 10, wherein the plurality of object units has uniform time lengths.

14. The apparatus of claim 10, wherein the plurality of object units is grouped into an object.

15. An apparatus for reproducing data, comprising:
a reproducing unit; and
a controller configured to control the reproducing unit to reproduce data of a digital stream from a recording medium using management information for accessing and managing for the reproduction of the data of the digital stream, wherein the data of the digital stream are grouped into a plurality of object units based on entry point information included in the digital stream, one or more of the plurality of object units being grouped into an object, wherein the management information includes presentation sequence information identifying a start time and an end time for the reproducing unit, map information and type indication information, wherein the map information includes an object unit index associated with the plurality of object units and location information associated with the plurality of object units, and wherein the type indication information indicates whether the data of the digital stream are grouped into the plurality of object units based on whether or not the entry point information is included in the digital stream.

16. The apparatus of claim 15, wherein, when the type indication information further indicates whether the data of the digital stream are grouped into the plurality of object units based on a predetermined arrival period, the location information identifies a size of the plurality of object units.

17. The apparatus of claim 16, wherein the predetermined arrival period is fixed.

18. The apparatus of claim 15, wherein the plurality of object units has uniform time lengths.

19. A method of reproducing data by a reproducing device, the method comprising:
reading, by the reproducing device, management information for accessing and managing for the reproduction of a data of a digital stream from a recording medium; and
reproducing, by the reproducing device, the data of the digital stream from the recording medium using management information, wherein the data of the digital stream are grouped into a plurality of object units based on entry point information included in the digital stream, one or more of the plurality of object units being grouped into an object, wherein the management information includes presentation sequence information identifying a start time and an end time for a presentation unit, map information and type indication information, wherein the map information includes an object unit index associated with the plurality of object units and location information associated with the plurality of object units, and wherein the type indication information indicates whether the data of the digital stream are grouped into the plurality of object units based on whether or not the entry point information is included in the digital stream.

20. The method of claim 2, wherein the predetermined arrival period is determined based on an arrival time of the data.

21. The non-transitory recording medium of claim 7, wherein the predetermined arrival period is determined based on an arrival time of the data.

22. The apparatus of claim 11, wherein the predetermined arrival period is determined based on an arrival time of the data.

* * * * *